United States Patent
Boodaei

(10) Patent No.: US 9,015,833 B2
(45) Date of Patent: Apr. 21, 2015

(54) DEFENSE AGAINST DNS DOS ATTACK

(71) Applicant: Trusteer Ltd., Tel Aviv (IL)

(72) Inventor: Michael Boodaei, Givatayim (IL)

(73) Assignee: Trusteer, Ltd., Tel Aviv (IL)

( * ) Notice: Subject to any disclaimer, the term of this patent is extended or adjusted under 35 U.S.C. 154(b) by 0 days.

(21) Appl. No.: 13/671,051

(22) Filed: Nov. 7, 2012

(65) Prior Publication Data

US 2014/0130152 A1    May 8, 2014

(51) Int. Cl.
*G06F 21/00*    (2013.01)
*H04L 29/12*    (2006.01)
*H04L 29/06*    (2006.01)

(52) U.S. Cl.
CPC ........ *H04L 61/1511* (2013.01); *H04L 63/1458* (2013.01)

(58) Field of Classification Search
None
See application file for complete search history.

(56) References Cited

U.S. PATENT DOCUMENTS

2011/0213882 A1* 9/2011 Swildens et al. ............. 709/225

OTHER PUBLICATIONS

European Search Report for Application No. EP 13 18 7301 dated Feb. 25, 2014.
How to Change DNS Server [online] [retrieved Feb. 14, 2014]. Retrieved from the Internet: <URL: http://www.techsupportalert.com/content/how-change-dns-server.htm>. (dated Jun. 16, 2012) 7 pages.
Google Chrome to add option for customer DNS servers [online] [retrieved Feb. 14, 2014]. Retrieved from the Internet: <URL: http://downloadsquad.switched.com/2010/10/24/google-chrome-to-add-option-for-custom-dns-servers/print>. (dated Oct. 24, 2010) 1 page.
Ballani, H. et al., *Mitigating DNS DoS Attacks*, Proceedings of the 15th ACM Conference on Computer and Communications Security, CCS '08 (dated Jan. 1, 2008) 10 pages.

* cited by examiner

*Primary Examiner* — Minh Dinh
*Assistant Examiner* — Devin Almeida
(74) *Attorney, Agent, or Firm* — Daniel J. Swirsky; AlphaPatent Associates Ltd.

(57) ABSTRACT

A method for defending a computer system comprising a DNS server against a DoS or a DDoS attack directed at said DNS server comprises replacing the address of said system provided by a user to a client software with an alternative address, wherein said address is replaced by a software agent associated with said user, such that said client software is capable of connecting with said system.

6 Claims, 1 Drawing Sheet

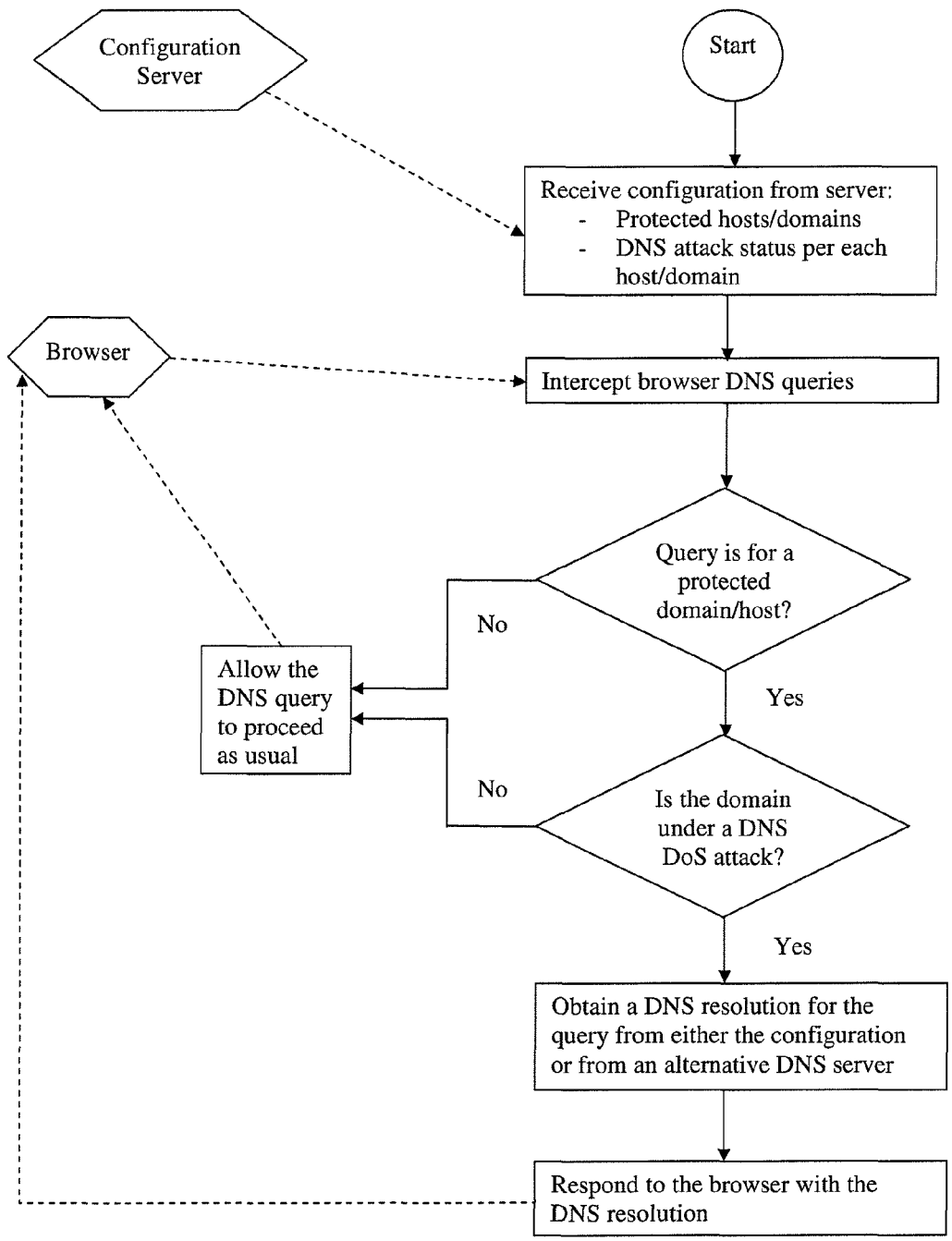

DEFENSE AGAINST DNS DOS ATTACK

FIELD OF THE INVENTION

The present invention relates to the field of Internet security. More particularly, the invention relates to a method and system suitable to respond to malicious attacks against a computer system, of the denial-of-service type.

BACKGROUND OF THE INVENTION

Distributed denial-of-service attack (DDoS attack) is an attempt to make a machine or network resource unavailable to its intended users. It generally consists of the efforts of one or more people to temporarily or indefinitely interrupt or suspend services of a host connected to the Internet.

One common method of denial-of-service (DoS) attack involves saturating the target machine with external communications requests, such that it cannot respond to legitimate traffic, or responds so slowly as to be rendered essentially unavailable. Such attacks usually lead to a server overload. In general terms, DoS attacks are implemented by either forcing the targeted computer(s) to reset, or consuming its resources so that it can no longer provide its intended service or obstructing the communication media between the intended users and the victim so that they can no longer communicate adequately.

A "denial-of-service" attack is characterized by an explicit attempt by attackers to prevent legitimate users of a service from using that service. There are two general forms of DoS attacks: those that crash services and those that flood services.

A DoS attack can be perpetrated in a number of ways. The five basic types of attack are:
- Consumption of computational resources, such as bandwidth, disk space, or processor time;
- Disruption of configuration information, such as routing information;
- Disruption of state information, such as unsolicited resetting of TCP sessions;
- Disruption of physical network components;
- Obstructing the communication media between the intended users and the victim so that they can no longer communicate adequately.
- Perpetrators of DDoS attacks typically target sites or services hosted on high-profile web servers such as banks, credit card payment gateways, etc.

A distributed denial of service attack (DDoS) occurs when multiple systems flood the bandwidth or resources of a targeted system, usually one or more web servers. These systems are compromised by attackers using a variety of methods.

Malware can carry DDoS attack mechanisms, such as MyDoom, the DoS mechanism of which was triggered on a specific date and time. This type of DDoS involves hardcoding the target IP address prior to release of the malware and no further interaction is then necessary to launch the attack.

DDoS tools, such as the well-known Stacheldraht, use classic DoS attack methods centered on IP spoofing and amplification like smurf attacks and fraggle attacks (also known as bandwidth consumption attacks). Newer tools can use DNS servers for DoS purposes.

The term "DDoS" refers to DoS attacks launched using many systems simultaneously to launch attacks against a remote host.

DDoS attacks have become more frequent against financial institutions, such as banks and have been known to disrupt their activity and that of their customers. Such attacks are open directed against the DNS server of the institution, thereby preventing the resolution of the hostname to which a customer's web browser is directed. It is therefore clear that it would be desirable to provide means by which regular activities of such institutions, as well as of any other body facing the same malicious attacks, could be maintained in spite of all the attacks.

It is an object of the present invention to provide a system and a method which enable a system that finds itself under a DDoS attack directed against its DNS server to continue functioning in spite of the attack.

It is another object of the invention to provide software means associated with the client software available to a customer, which are suitable to prevent or limit the difficulty of the customer in reaching the desired host.

Other objects and advantages of the invention will become apparent as the description proceeds.

SUMMARY OF THE INVENTION

The invention relates to a method for defending a computer system comprising a DNS server against a DoS or a DDoS attack directed at said DNS server, comprising replacing the address of said system provided by a user to a client software with an alternative address, wherein said address is replaced by a software agent associated with said user, such that said client software is capable of connecting with said system.

According to one embodiment of the invention the software agent is integral with the client software or web browser used by the user. According to another embodiment of the invention the software agent is separate software that interacts with a browser or other client software.

The alternative address can be the address of an alternative DNS server or a static IP address of a resource that must be reached by the user's client software.

The invention is further directed to software agent suitable to detect a failure to resolve a hostname/domain of a target system and, when such failure is detected, to redirect client software used to communicate with said target system to a different address.

Also encompassed by the invention is a system for defending against DoS and DDoS attacks, comprising one or more of an alternative DNS server, a static IP address and a configuration server, the address of which have not being advertised.

BRIEF DESCRIPTION OF THE DRAWING

FIG. 1 is a schematic flow chart of an illustrative system operating in accordance with one embodiment of the invention, which employs a Configuration Server.

DETAILED DESCRIPTION OF THE INVENTION

According to the invention, when a DNS server of a system becomes unavailable due to a DDoS attack and, accordingly, the browser of a user who is attempting to connect to that system is not able to obtain DNS resolution of the hostname/domain of that system, the user's browser is directed to a different address than selected by the user. Said different address can be created in a variety of manners and it replaces the hostname or other address originally submitted to the browser by the user (either by using a bookmark or by typing it) in a manner that is transparent to the user himself. In the examples to follow the various operations described can be performed by software integral with the client software or web browser used by the user, or by a separate software that interacts with such browser or client software. For the purpose of illustration two alternative embodiment of the invention are discussed below.

Using an Alternative DNS Server

According to this embodiment of the invention an alternative DNS server is provided, for use in this scenario, which is not advertised and not made known to the public. In this embodiment once a DoS or a DDoS attack is detected the software provided to the user instructs the client software used to communicate with the system to move to address resolution using the alternative DNS server.

In this way, users are able to continue to receive service while the system deals with the attack. As will be apparent to the skilled person, because the DNS server is not advertised only users provided with client software distributed by the relevant system will be able to reach it.

A schematic flow chart of an illustrative system operating in accordance with one embodiment of the invention, which employs a Configuration Server, is shown in FIG. 1. The operation of this illustrative system is self-evident from the flow chart and this description and, therefore, is not further discussed for the sake of brevity.

Using a Static IP Address

In an alternative embodiment of the invention no alternative DNS server is provided. Instead, the resource that must be reached by the user is associated with a static IP address, which again is not advertised and is only available to the software that is integral, or works together with the client software used by the user to access the system. Once the regular DNS server of the system becomes unavailable the software provided in or with the client software replaces the request to the DNS server with the static IP address, thus making it possible for the user to obtain service.

Several ways are available to the software to perform the replacement of the DNS server address with either that of an alternative DNS server or a static IP, or any other desired location. The actual method used depends on the operating system of the user and the skilled person will implement the method that is the most suitable for a given operating system. For instance, it is possible on the operating system level to utilize the DNS API process. In other operating systems is possible to interfere with the operation of the DNS client or, on the network level, it may be desirable to intercept the UDP outgoing packet and then to create a fake incoming packet suitable to redirect the client software as desired.

The invention may operate in different modes, three of which are detailed below for the purpose of illustration:

1. Automatic mode: the software agent located on the user's terminal detects a certain number of consecutive failures for DNS resolution of a particular hostname/domain and/or failure ratio greater than a given threshold. The software agent then activates the alternative DNS/static address resolution for the relevant hostname/domain.

2. Manual mode: the software agent periodically polls a "configuration server", which is responsible for monitoring the DNS server and for identifying DDoS activity. Monitoring the bank's DNS server is one way of getting notified about a DNS DDoS attack against the bank's DNS server, but other methods (such as, for instance, receiving an alert directly from the owner of the DNS server) can of course be employed. When the configuration server provides a configuration with a DDoS flag turned on, the software agent transitions to the alternative DNS/static IP address.

3. Manual mode with fullback: this mode open rates as mode (2) with the exception that if the configuration server itself is not responsive the software agent transitions to the alternative DNS/static IP address on the assumption that the configuration server itself has come under DDoS attack.

All the above description and examples have been provided for the purpose of illustration and are not meant to limit the invention in any way except as provided by the appended claims.

The invention claimed is:

1. A method for defending a computer system comprising a DNS server against a DoS or a DDoS attack directed at said DNS server, comprising:
    a) identifying said attack by a configuration server, which monitors the DNS server by detecting consecutive failures for DNS resolution of a hostname/domain requested by a client software that is located on a user's terminal and used to communicate with said system;
    b) polling said configuration server by a software agent located on the user's terminal, to detect said attack;
    c) if an attack is detected, activating by said software agent an alternative address resolution for said hostname/domain;
    d) replacing the address of said system provided by a user to said client software with said alternative address resolution; and
    e) connecting said client software with said system via said alternative address resolution.

2. A method according to claim 1, wherein the software agent is integral with the client software or web browser used by the user.

3. A method according to claim 1, wherein the software agent is a separate software that interacts with a browser or other client software.

4. A method according to claim 1, wherein the alternative address is the address of an alternative DNS server.

5. A method according to claim 1, wherein the alternative address is a static IP address of a resource that must be reached by a user's client software.

6. A system for defending against DoS and DDoS attacks, comprising:
    a) a configuration server for identifying said attacks by monitoring a DNS server and detecting consecutive failures for DNS resolution of a hostname/domain requested by a client software located on a user's terminal and used to communicate with said hostname/domain; and
    b) a user's terminal having a software agent located thereon, said software agent is adapted to:
        b.1) poll said configuration server to detect said attack and if said attack is detected, activate an alternative address resolution for said hostname/domain;
        b.2) replace an address of said system provided by a user to said client software with said alternative address resolution; and
        b.3) connect said client software with said hostname/domain via said alternative address resolution.

* * * * *